(12) United States Patent
Wu et al.

(10) Patent No.: US 10,481,745 B2
(45) Date of Patent: Nov. 19, 2019

(54) METHOD AND APPARATUS FOR DETERMINING TOUCH POSITION OF CAPACITIVE SCREEN

(71) Applicant: SHENZHEN GOODIX TECHNOLOGY CO., LTD., Shenzhen (CN)

(72) Inventors: Shuang Wu, Shenzhen (CN); Huafei Li, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 66 days.

(21) Appl. No.: 15/984,428

(22) Filed: May 21, 2018

(65) Prior Publication Data

US 2018/0267647 A1 Sep. 20, 2018

Related U.S. Application Data

(63) Continuation of application No. PCT/CN2016/106222, filed on Nov. 17, 2016.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ................................ G06F 3/044; G06F 3/0416
See application file for complete search history.

(56) References Cited

U.S. PATENT DOCUMENTS

| 8,810,537 B2 | 8/2014 | Yousefpor et al. |
| 2015/0035797 A1 | 2/2015 | Shahparnia |
| 2015/0217843 A1* | 8/2015 | Leinikki ............... B63C 11/02 345/174 |
| 2016/0291796 A1* | 10/2016 | Ho ........................ G06F 3/044 |

FOREIGN PATENT DOCUMENTS

| CN | 103064570 A | 4/2013 |
| CN | 103324373 A | 9/2013 |
| CN | 104156120 A | 11/2014 |
| CN | 104516612 A | 4/2015 |
| CN | 106062688 A | 10/2016 |

* cited by examiner

*Primary Examiner* — Andrew Sasinowski

(57) ABSTRACT

Embodiments of the present application provide a method and apparatus for determining a touch position of a capacitive screen. The method includes: acquiring an output signal of each capacitor node, and orthogonally demodulating the output signal to acquire a corresponding orthogonal component Q; judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode; and determining that the capacitive screen is touched, and determining the touch position according to coordinates of the capacitor node whose orthogonal component Q decreases if the judgment indicates a positive result.

20 Claims, 8 Drawing Sheets

| 303 | 342 | 372 | 394 | 411 | 419 | 430 | 431 | 391 | 362 | 326 | 299 | 263 | 268 |
|---|---|---|---|---|---|---|---|---|---|---|---|---|---|
| 334 | 378 | 397 | 424 | 442 | 448 | 447 | 452 | 415 | 383 | 346 | 314 | 282 | 284 |
| 316 | 362 | 382 | 399 | 406 | 411 | 418 | 425 | 396 | 360 | 323 | 298 | 256 | 257 |
| 297 | 327 | 342 | 360 | 334 | 339 | 351 | 369 | 352 | 318 | 294 | 270 | 238 | 244 |
| 336 | 372 | 383 | 396 | 381 | 379 | 391 | 404 | 384 | 349 | 320 | 298 | 266 | 271 |
| 318 | 364 | 374 | 390 | 390 | 389 | 401 | 404 | 372 | 334 | 306 | 278 | 245 | 250 |
| 266 | 304 | 314 | 336 | 342 | 349 | 349 | 341 | 316 | 284 | 257 | 223 | 201 | 207 |
| 241 | 272 | 284 | 297 | 313 | 315 | 310 | 310 | 286 | 253 | 229 | 205 | 179 | 186 |
| 203 | 230 | 246 | 258 | 272 | 275 | 272 | 270 | 241 | 218 | 190 | 168 | 149 | 153 |
| 167 | 196 | 210 | 221 | 233 | 239 | 236 | 233 | 209 | 182 | 154 | 145 | 120 | 118 |
| 143 | 167 | 179 | 197 | 206 | 209 | 217 | 201 | 183 | 153 | 135 | 119 | 103 | 96 |
| 124 | 144 | 159 | 166 | 180 | 185 | 188 | 182 | 153 | 136 | 113 | 101 | 78 | 85 |
| 107 | 124 | 128 | 150 | 158 | 162 | 159 | 153 | 136 | 112 | 97 | 81 | 69 | 61 |
| 84 | 104 | 110 | 128 | 135 | 144 | 139 | 130 | 116 | 94 | 76 | 66 | 49 | 46 |
| 62 | 76 | 88 | 95 | 109 | 111 | 111 | 104 | 88 | 71 | 52 | 45 | 30 | 33 |
| 64 | 74 | 82 | 92 | 105 | 113 | 103 | 99 | 81 | 63 | 53 | 38 | 24 | 19 |
| 42 | 52 | 64 | 70 | 79 | 84 | 81 | 84 | 62 | 49 | 38 | 24 | 15 | 15 |
| 21 | 35 | 47 | 49 | 63 | 67 | 68 | 63 | 44 | 36 | 23 | 13 | 2 | 2 |

FIG. 1

| 81 | 135 | 184 | 229 | 271 | 296 | 319 | 323 | 209 | 182 | 155 | 137 | 114 | 103 |
|---|---|---|---|---|---|---|---|---|---|---|---|---|---|
| 111 | 170 | 214 | 259 | 303 | 327 | 339 | 345 | 230 | 197 | 166 | 147 | 127 | 115 |
| 82 | 143 | 181 | 228 | 256 | 269 | 295 | 307 | 191 | 163 | 135 | 117 | 97 | 83 |
| 134 | 180 | 214 | 253 | 257 | 270 | 288 | 305 | 214 | 183 | 157 | 135 | 116 | 111 |
| 171 | 226 | 264 | 303 | 317 | 325 | 344 | 349 | 250 | 217 | 186 | 163 | 137 | 127 |
| 128 | 190 | 220 | 259 | 288 | 298 | 315 | 314 | 200 | 174 | 144 | 126 | 99 | 93 |
| 82 | 127 | 155 | 193 | 220 | 238 | 244 | 239 | 143 | 119 | 95 | 76 | 64 | 57 |
| 31 | 64 | 89 | 117 | 142 | 157 | 160 | 160 | 72 | 64 | 47 | 30 | 26 | 18 |
| 0 | 33 | 50 | 76 | 100 | 112 | 117 | 120 | 41 | 26 | 12 | 10 | 2 | -7 |
| -15 | 7 | 27 | 48 | 71 | 82 | 93 | 89 | 14 | 7 | -3 | -6 | -12 | -19 |
| -28 | -10 | 6 | 22 | 40 | 57 | 62 | 61 | -5 | -12 | -17 | -21 | -29 | -27 |
| -45 | -28 | -18 | 4 | 20 | 33 | 32 | 36 | -22 | -27 | -31 | -34 | -35 | -45 |
| -49 | -36 | -37 | -10 | 2 | 13 | 17 | 14 | -32 | -38 | -47 | -43 | -46 | -53 |
| -67 | -63 | -49 | -39 | -22 | -17 | -12 | -13 | -52 | -61 | -63 | -62 | -57 | -65 |
| -65 | -65 | -55 | -42 | -29 | -19 | -17 | -17 | -66 | -64 | -60 | -66 | -63 | -68 |
| -78 | -73 | -65 | -57 | -47 | -37 | -36 | -26 | -71 | -72 | -66 | -69 | -63 | -64 |
| -101 | -97 | -92 | -83 | -74 | -66 | -62 | -60 | -97 | -91 | -84 | -84 | -81 | -84 |

FIG. 2

METHOD AND APPARATUS FOR DETERMINING TOUCH POSITION OF CAPACITIVE SCREEN

CROSS REFERENCE TO RELATED APPLICATIONS

The present application is a continuation of international application No. PCT/CN2016/106222, filed on Nov. 17, 2016, which is hereby incorporated by reference in its entirety.

TECHNICAL FIELD

The present application pertains to the field of touch technologies, and in particular, relates to a method and apparatus for determining a touch position of a capacitive screen underwater.

BACKGROUND

Smart terminals are generally equipped with various operating systems, and various functions may be customized according to users' requirements. Smart terminals commonly used in our daily lives include smart mobile terminals, smart vehicle-mounted terminals, smart televisions, smart wearable devices and the like.

With the development of smart terminal technologies, smart terminals having the underwater operation function are gradually coining into users' lives. For example, users may perform such gesture operations as tap, swipe and the like on the smart terminals underwater.

In practice of the present application, the inventors have found that: a capacitive touch screen is used as an input device for the gesture operations on the smart terminal, and in a normal usage environment, a dielectric medium of each capacitor node is air; and a finger touch to the touch screen may cause the capacitances of the capacitor nodes of the touch screen to vary, and thus touch detection may be implemented according to this feature. However, if the touch screen is operated underwater, the dielectric medium of each capacitor node becomes the water, of which the dielectric constant is greatly different from the air, where the dielectric constant of air is 1.000585 whereas the dielectric constant of water is 81.5. Therefore, relative to the case where the dielectric medium is air, the impedance between the capacitor nodes becomes smaller when the dielectric medium is water, and variation of the capacitor node before and after been touched is also different. Accordingly, if whether a finger touch is present is still judged in the same way as that in air, the position of the touch may not be accurately determined.

Therefore, how to accurately determine a touch position of a capacitive screen underwater is a technical problem in the related art to be urgently solved.

SUMMARY

The present application provides a method and apparatus for determining a touch position of a capacitive screen underwater. An output signal of each capacitor node is orthogonally demodulated to acquire a corresponding orthogonal component Q, and the touch position is determined according to coordinates of the capacitor node whose orthogonal component Q decreases if the judgment indicates a positive result. In this way, the accuracy of determining the capacitive screen underwater can be improved.

One embodiment of the present application provides a method for determining a touch position of a capacitive screen. The method includes acquiring an output signal of each capacitor node of the capacitive screen, and orthogonally demodulating the output signal to acquire a corresponding orthogonal component Q; judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode; and determining that the capacitive screen is touched, and determining the touch position according to coordinates of the capacitor node whose orthogonal component Q decreases if the judgment indicates a positive result.

Another embodiment of the present application provides an apparatus for determining a touch position of a capacitive screen. The apparatus includes: a signal demodulating module, configured to acquire an output signal of each capacitor node of the capacitive screen, and orthogonally demodulate the output signal to acquire a corresponding orthogonal component Q; a touch judging module, configured to judge whether corresponding orthogonal components Q of some of the capacitor nodes increase relative to a reference orthogonal component Q in an underwater mode, and whether corresponding orthogonal components Q of some other of the capacitor nodes decrease relative to the reference orthogonal component Q in the underwater mode; and a position determining module, configured to determine that the capacitive screen is touched, and determine the touch position according to coordinates of the capacitor node whose orthogonal component Q decreases if the judgment indicates a positive result.

Still another embodiment of the present application further provides a non-volatile computer storage medium. The non-volatile computer storage medium stores computer-executable instructions, which, when being executed, cause a computer to: acquire an output signal of each capacitor node of the capacitive screen, and orthogonally demodulate the output signal to acquire a corresponding orthogonal component Q; judge whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode; and determine that the capacitive screen is touched, and determine the touch position according to coordinates of the capacitor node whose orthogonal component Q decreases if the judgment indicates a positive result.

Yet still another embodiment of the present application further provides an electronic device. The electronic device includes: at least one processor; and at least one memory. The at least one memory stores program instructions that are executable by the at least one processor. The program instructions, when being executed by the at least one process, cause the at least one processor to: acquire an output signal of each capacitor node of the capacitive screen, and orthogonally demodulate the output signal to acquire a corresponding orthogonal component Q; judge whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode; and determine that the capacitive screen is touched, and determine the touch position according to coordinates of the capacitor node whose orthogonal component Q decreases if the judgment indicates a positive result.

In the embodiments of the present application, an output signal of each capacitor node is orthogonally demodulated to acquire a corresponding orthogonal component Q, and the touch position is determined according to coordinates of the capacitor node whose orthogonal component Q decreases if the judgment indicates a positive result that the capacitive screen underwater is touched. In this way, the accuracy of determining the capacitive screen underwater is improved.

BRIEF DESCRIPTION OF THE DRAWINGS

To more clearly describe technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein without any creative effort.

FIG. 1 is a schematic diagram of a variation of an orthogonal component Q of each capacitor node when the capacitive screen is pressed underwater;

FIG. 2 is a schematic diagram of a variation of a capacitance of each capacitor node when the capacitive screen is pressed underwater;

DETAILED DESCRIPTION

Figure 3:
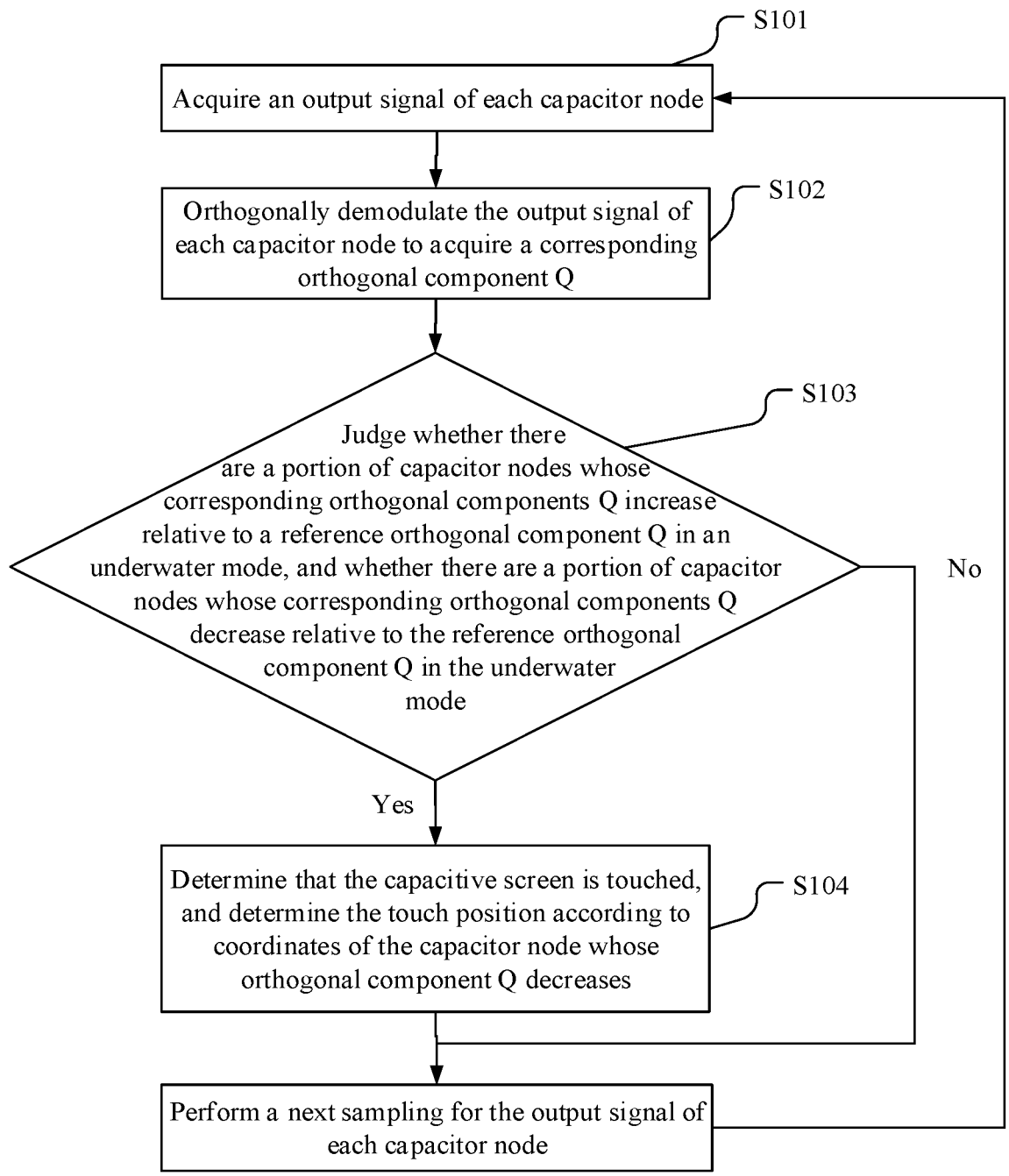
FIG. 3 is a flowchart of a method for determining a touch position of a capacitive screen according to a first embodiment of the present application.

To make the objectives, technical features, and advantages of the present application clearer and more understandable, the technical solutions according to the embodiments of the present application are further described in detail with reference to the accompany drawings of the present application. Apparently, the embodiments described herein are merely some exemplary ones, rather than all the embodiments of the present application. Based on the embodiments of the present application, all other embodiments derived by persons of ordinary skill in the art without any creative efforts shall fall within the protection scope of the present application.

In the present application, an output signal of each capacitor node is orthogonally demodulated to acquire a corresponding orthogonal component Q, and coordinates of the touch point are acquired according to the orthogonal component Q. In this way, the accuracy of determining the capacitive screen underwater is improved.

In practice of the present application, the inventors have found that when the capacitive screen is pressed underwater, variations of the capacitance of each capacitor node are as schematically illustrated in FIG. 1. For each capacitor node, a variation of the capacitance thereof is obtained by subtracting the capacitance of each capacitor node from a reference capacitance. Therefore, in FIG. 1, a positive value indicates that the capacitance decreases and a negative value indicates that the capacitance increases. However, as seen from FIG. 1, there is no clear envelope formed between the variations of the capacitances of a touched region and a non-touched region, and thus it is hard to differentiate the touched region from the non-touched region.

FIG. 2 is a schematic diagram of a variation of an orthogonal component Q of each capacitor node when the capacitive screen is pressed underwater; When the capacitive screen is touched underwater, the orthogonal component Q of the capacitor node in the touched region and the orthogonal component Q of the capacitor node in the non-touched region respectively decrease and increase. Therefore, the orthogonal component Q of the capacitor node in the touched region and the orthogonal component Q of the capacitor node in the non-touched region are subjected to an inverse variation trend, and thus whether a touch event is generated on the capacitive screen may be judged according to this feature.

As illustrated in FIG. 1, with respect to each capacitor node, the variation of the orthogonal component Q may be acquired by subtracting the orthogonal component Q from a corresponding reference orthogonal component Q. A positive value indicates that the orthogonal component Q decreases, and a negative value indicates that the orthogonal component Q increases. As seen from FIG. 2, a clear envelop is present between the touched region and the non-touched region. Nevertheless, the underwater mode described in the present application may also include other liquids, such as, alcohol, gasoline or the like. In different liquids, the reference orthogonal component corresponding to each capacitor node may vary from the reference orthogonal component thereof in the underwater mode.

Referring to FIG. 3, in a specific embodiment of the present application, the method includes the following steps:

S101: acquiring an output signal of each capacitor node;

In this embodiment, the capacitive screen includes a touch controller chip and a screen provided with a plurality of capacitor nodes, and the output signal may be acquired by the touch controller chip from the capacitor nodes. Specifically, the touch controller chip includes a sending end and a receiving end. The sending end may send a signal having a fixed frequency, where the waveform of the signal may be a square wave or a sine wave or the like. The signal may be acquired by orthogonal modulation of two sub signals with a 90-degree phase difference but the same frequency. The signal sent by the sending end is input to an electrode plate of each capacitor node, coupled by the capacitor node, and output from the other electrode plate of the capacitor node to the receiving end of the touch controller chip. In this embodiment, the signal output from the other electrode plate of the capacitor node is used as the output signal.

S102: performing orthogonal demodulation to the output signal of each capacitor node to acquire a corresponding orthogonal component Q.

In this embodiment, a signal having the same frequency as the signal sent by the sending end is extracted from the output signals received by the touch controller chip, and the extracted signal is orthogonally demodulated to acquire an orthogonal component Q. This embodiment provides a method for acquiring an orthogonal component Q. The method specifically includes the following steps:

After the touch controller chip obtains an output signal $A \sin(\omega t + \varphi)$ of the capacitor node, the output signal is frequency-mixed by using a multiplier to obtain a frequency-mixed signal $\frac{1}{2}[A \sin(2\omega t + \varphi) + A \sin \varphi]$, the frequency-mixed signal is filtered by a low-pass filter, thus an alternating current signal therein is filtered and a direct current signal $\frac{1}{2}A \sin(\varphi)$ is retained, then the direct current signal is integrated by using an integrator: $N[\frac{1}{2}A \sin(\varphi)]$, to obtain an orthogonal component Q, where A denotes an amplitude, $\omega$ denotes an angular velocity, $\varphi$ denotes an initial phase, and N denotes a number of cycles of the signal.

S103: judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode; if the judgment indicates a positive result, determining that the capacitive screen is touched and performing step S104, or otherwise, performing a next sampling the output signal of each capacitor node.

In practice of the present application, the inventors have found through a large number of statistical collections that when the capacitive screen is touched underwater as illustrated in FIG. 2, the variation of the orthogonal component Q relative to the reference orthogonal component can be distinctly identified, such that whether a touch event is generated on the capacitive screen may be determined accordingly. The reference orthogonal component refers to an orthogonal component Q obtained by orthogonal demodulating the output signal of the capacitor node when there is no touch on the screen underwater.

In this embodiment, the orthogonal components Q of the capacitor nodes are compared with the reference orthogonal components Q in the underwater mode, and the capacitor nodes whose orthogonal components Q increase and the capacitor nodes whose orthogonal components Q decrease are respectively statistically collected to obtain corresponding statistical values. If the two statistical values are both greater than a predetermined threshold, it is considered that there are a portion of capacitor nodes whose corresponding orthogonal components Q increase relative to the reference orthogonal component Q in the underwater mode and there are a portion of capacitor nodes whose corresponding orthogonal components Q decrease relative to the reference orthogonal component Q in the underwater mode. Using FIG. 2 as an example, the data in FIG. 2 are values obtained by subtracting the actual orthogonal components from the reference orthogonal component Q. Therefore, a positive value indicates that the orthogonal component Q decreases, a negative value indicates that the orthogonal component Q increases, and a value 0 indicates that the orthogonal component Q does not change. If the predetermined threshold is defined as 20, there are 149 capacitor nodes whose orthogonal components Q decrease in FIG. 2, there are 89 capacitor nodes whose orthogonal components Q increase in FIG. 2, and there is one node whose orthogonal component Q does not change. The statistical values of the capacitor nodes whose orthogonal components Q increase and the capacitor nodes whose orthogonal components Q decrease are both greater than the predetermined threshold. Therefore, it may be determined that the capacitive screen is touched. The above data is only intended to adaptively describe this embodiment, and the predetermined threshold may be defined according to practice, which is not limited in this embodiment.

In this embodiment, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode may be judged according to an envelop curve. Using FIG. 2 as an example, if there is a capacitor node whose variation is inverse to the current capacitor node among the adjacent capacitor nodes of the current capacitor node, it is considered that the current capacitor node is on the envelop curve. The capacitor nodes on the envelop curve are statistically collected to obtain a statistical value. If the statistical value is greater than a predetermined threshold and the envelop is clear, it is determined that the capacitive screen is touched.

S104: determining the touch position according to coordinates of the capacitor node whose orthogonal component Q decreases.

When the capacitive screen is touched, the orthogonal component Q corresponding to the capacitor node at the actual touch position decreases, and the orthogonal components Q corresponding to the capacitor nodes in the vicinity of the actual touch position decrease too, it means that the capacitor nodes whose orthogonal components Q decrease is subject to a press event. If the orthogonal components Q of the capacitor nodes in other regions increase, it means that the capacitor nodes whose orthogonal components Q increase do not subject to a press event. Therefore, the touch regions described in this step may include the actually touched regions and the regions in the vicinity of the actually touched regions. In determination of the touch position, coordinates of the capacitor node at the actual touch position and coordinates of the capacitor nodes in the vicinity of the actual touch position may be both considered to calculate the touch position.

Figure 4:
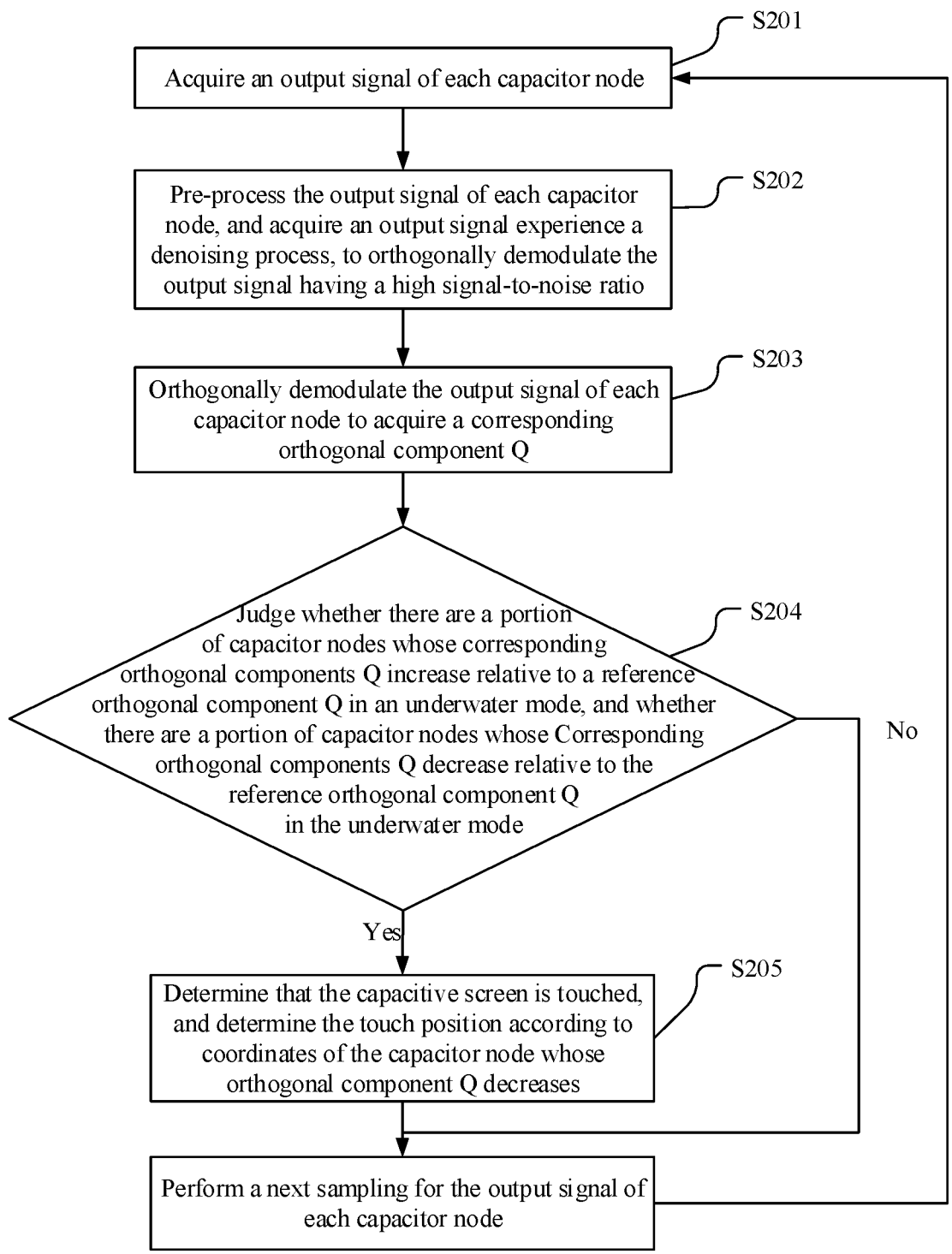
FIG. 4 is a flowchart of a method for determining a touch position of a capacitive screen according to a second embodiment of the present application.

Referring to FIG. 4, in another specific embodiment of the present application, different from the embodiment as illustrated in FIG. 3, a pre-processing step is added. Specifically, the method includes the following steps:

S201: acquiring an output signal of each capacitor node.

S202: performing pre-processing to the output signal of each capacitor node to obtain an output signal having a relative high signal-to-noise ratio which can be orthogonally demodulated in the following steps.

Specifically, the pre-processing may include: amplifying the output signal of the capacitor node, and denoising the output signal of the capacitor node to improve the signal-to-noise ratio.

S203: The output signal been pre-processed of each capacitor node is orthogonally demodulated to acquire a corresponding orthogonal component Q.

S204: judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode; performing step S205 if the judgment indicates a positive result, or otherwise performing a next sampling to the output signal of each capacitor node.

S205: determining that the capacitive screen is touched, and determining the touch position according to coordinates of the capacitor node whose orthogonal component Q decreases.

In this embodiment of the present application, the output signal of the capacitor node is pre-processed to obtain a denoised output signal. This improves the accuracy of signal processing.

In this embodiment, steps S201, S203, S204 and S205 are respectively similar to steps S101, S102, S103 and S104 in the embodiment as illustrated in FIG. 3, which are not described herein any further.

Figure 5:
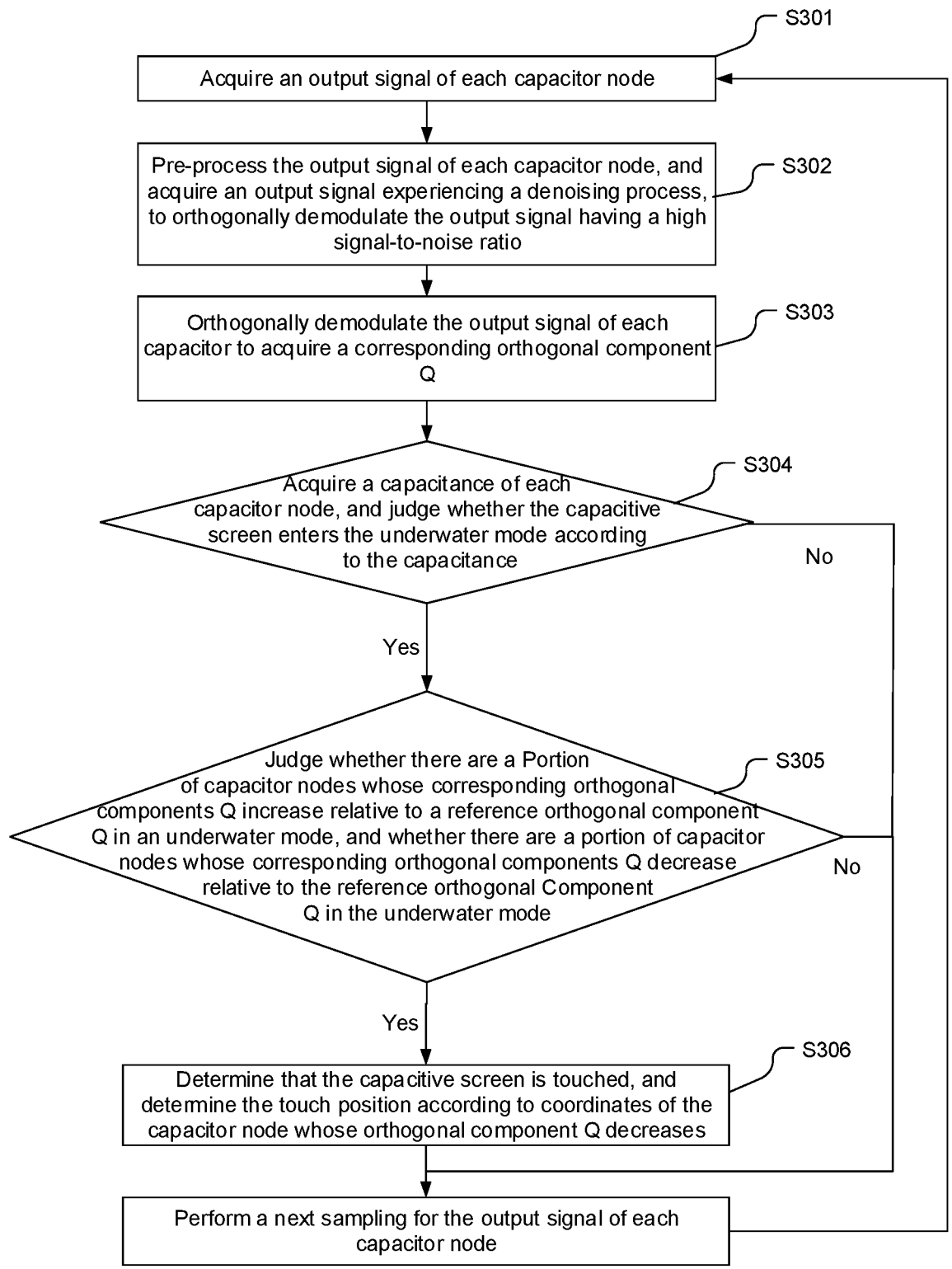
FIG. 5 is a flowchart of a method for determining a touch position of a capacitive screen according to a third embodiment of the present application.

Referring to FIG. 5, in another specific embodiment of the present application, based on the embodiment as illustrated in FIG. 4, a step of judging whether the capacitive screen is in the underwater mode can be added. Specifically, the method includes the following steps:

S301: acquiring an output signal of each capacitor node;

S302: performing pre-processing to the output signal of each capacitor node to obtain an denoised output signal which can be orthogonally demodulated in the following steps.

S303: performing orthogonal demodulation to the denoised output signal of each capacitor node to acquire a corresponding orthogonal component Q.

S304: acquiring a capacitance of each capacitor node, and judging whether the capacitive screen enters the underwater mode according to the capacitance.

Specifically, in this embodiment, the output signal of the capacitor node may be orthogonally demodulated to acquire an in-phase component I and an orthogonal component Q, and the capacitance may be calculated according to the in-phase component I and the orthogonal component Q. In this embodiment, the capacitance may be acquired in other ways. For example, if the capacitance of the capacitive screen is acquired by another module relevant to the determined touch position of the capacitive screen, then the capacitance may be acquired by using this relevant module.

Specifically, in this embodiment, the capacitances of all the capacitor nodes are one-by-one compared with the reference capacitance obtained when there is no touch in the non-underwater mode. If the capacitance of each capacitor node is less than the reference capacitance, it can be determined that the capacitive screen is in the underwater mode.

S305: judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode; performing step S306 if the judgment indicates a positive result, or otherwise performing a next sampling to the output signal of each capacitor node.

S306: determining that the capacitive screen is touched, and determining the touch position according to coordinates of the capacitor node whose orthogonal component Q decreases.

In this embodiment, steps S301, S302, S303, S305 and S306 are respectively similar to steps S201, S202, S203, S204 and S205 in the embodiment as illustrated in FIG. 4, which are not described herein any further.

Nevertheless, in this embodiment, whether the capacitive screen is in the underwater mode may also be judged in other ways. For example, an output voltage of the capacitor node is compared with a reference output voltage in the non-underwater mode; and if the output voltage of each capacitor node increases, it is determined that the capacitive screen is in the underwater mode.

Figure 6:
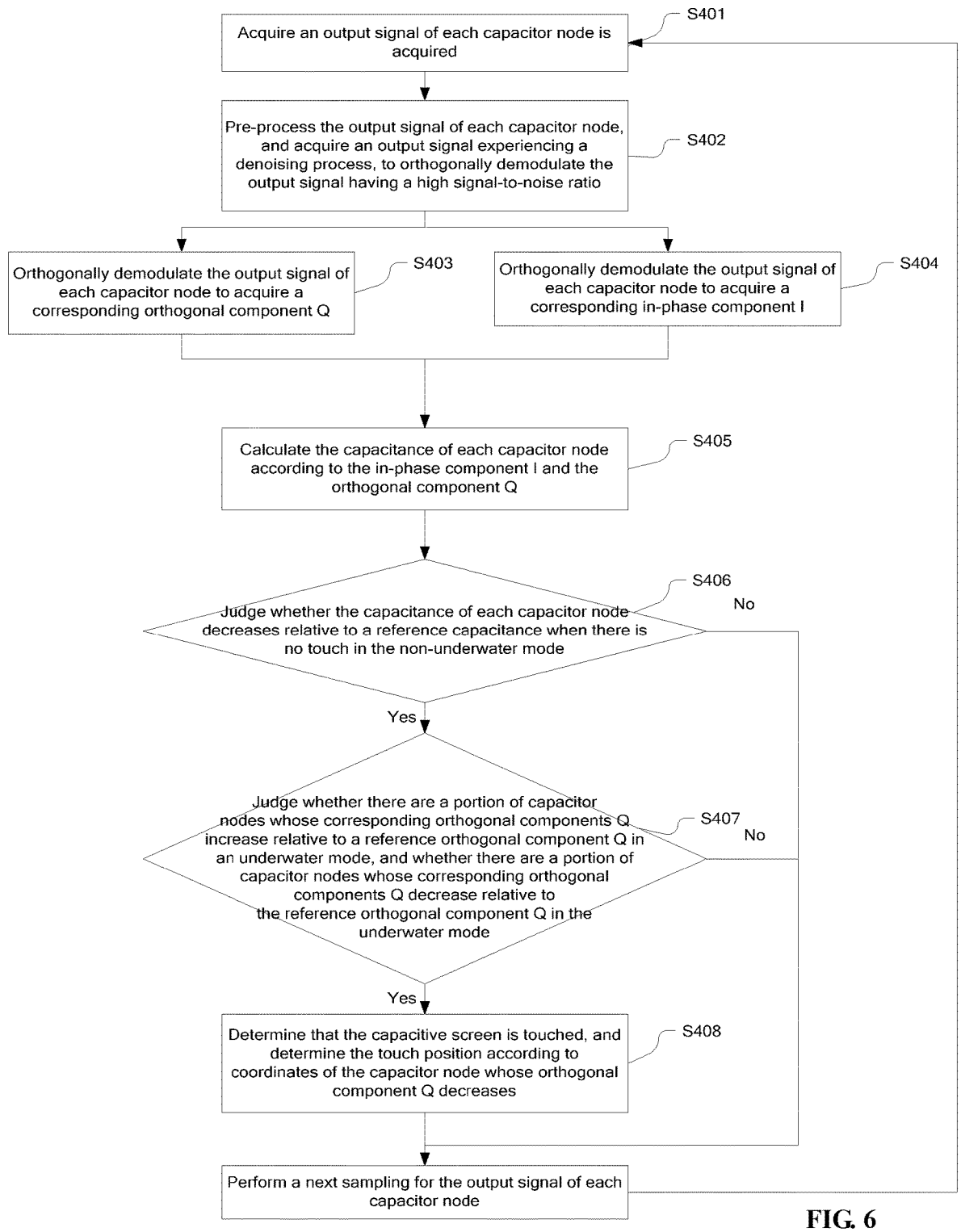
FIG. 6 is a flowchart of a method for determining a touch position of a capacitive screen according to a fourth embodiment of the present application.

Referring to FIG. 6, in another embodiment of the present application, the method includes the following steps:

S401: acquiring an output signal of each capacitor node;

S402: performing pre-processing to the output signal of each capacitor node to obtain a denoised output signal which can be orthogonally demodulated in the following steps.

S403: performing orthogonal demodulation to the output signal of each capacitor node to acquire a corresponding orthogonal component Q.

S404: performing orthogonal demodulation to the output signal of each capacitor node to acquire a corresponding in-phase component I.

In this embodiment, through the orthogonal demodulation, two orthogonal direct current components may be acquired, where one of the two orthogonal direct current components is the in-phase component I. This embodiment provides a method for acquiring an in-phase component I. The method specifically includes the following steps:

After the touch controller chip obtains an output signal $A \sin(\omega t+\varphi)$ of the capacitor node, the output signal is frequency-mixed by using a multiplier to obtain a frequency-mixed signal $-\frac{1}{2}[A \cos(2\omega t+\varphi)-A \cos \varphi]$, the frequency-mixed signal is filtered by using a low-pass filter to filter an alternating current signal therein and retain a direct current signal $\frac{1}{2}A \cos(\varphi)$ therein, then the direct current signal is integrated by using an integrator: $N[\frac{1}{2}A \cos(\varphi)]$, to obtain an in-phase component I, where A denotes an amplitude, $\omega$ denotes an angular velocity, $\varphi$ denotes an initial phase, and N denotes the number of cycles of the signal.

In this embodiment, steps S403 and S404 may also be performed in an integral step while the output signal of each capacitor node is orthogonally demodulated.

In this embodiment, based on the embodiment as illustrated in FIG. 5, step S304 may further include steps S405 and S406.

S405: calculating the capacitance of each capacitor node according to the in-phase component I and the orthogonal component Q.

Specifically, the capacitance of each capacitor node is calculated according to moduli of the in-phase component I and the orthogonal component Q. The calculated capacitance is proportional to the actual capacitance of the capacitor node, and the capacitance may be calculated using the following formula:

$$C=\sqrt{I^2+Q^2} \qquad (1)$$

S406: judging whether the capacitance of each capacitor node decreases relative to a reference capacitance acquired when there is no touch in the non-underwater mode; if the capacitance of each capacitor node decreases relative to the reference capacitance, determining that the capacitive screen is in the underwater mode and performing step S307, or otherwise performing a next sampling to the output signal of each capacitor node.

Specifically, in this embodiment, the capacitances of all the capacitor nodes are one-by-one compared with the reference capacitance obtained when there is no touch in the non-underwater mode. If the capacitance of each capacitor node is less than the reference capacitance, it can be determined that the capacitive screen is in the underwater mode.

S407: judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode; performing step S306 if the judgment indicates a positive result, or otherwise performing a next sampling to the output signal of each capacitor node.

S408: determining that the capacitive screen is touched, and determining the touch position according to coordinates of the capacitor nodes whose orthogonal component Q decrease.

In this embodiment, steps S401, S402, S404, S407 and S408 are respectively similar to steps S301, S302, S303, S305 and S306 in the embodiment as illustrated in FIG. 5, which are not described herein any further.

Figure 7:
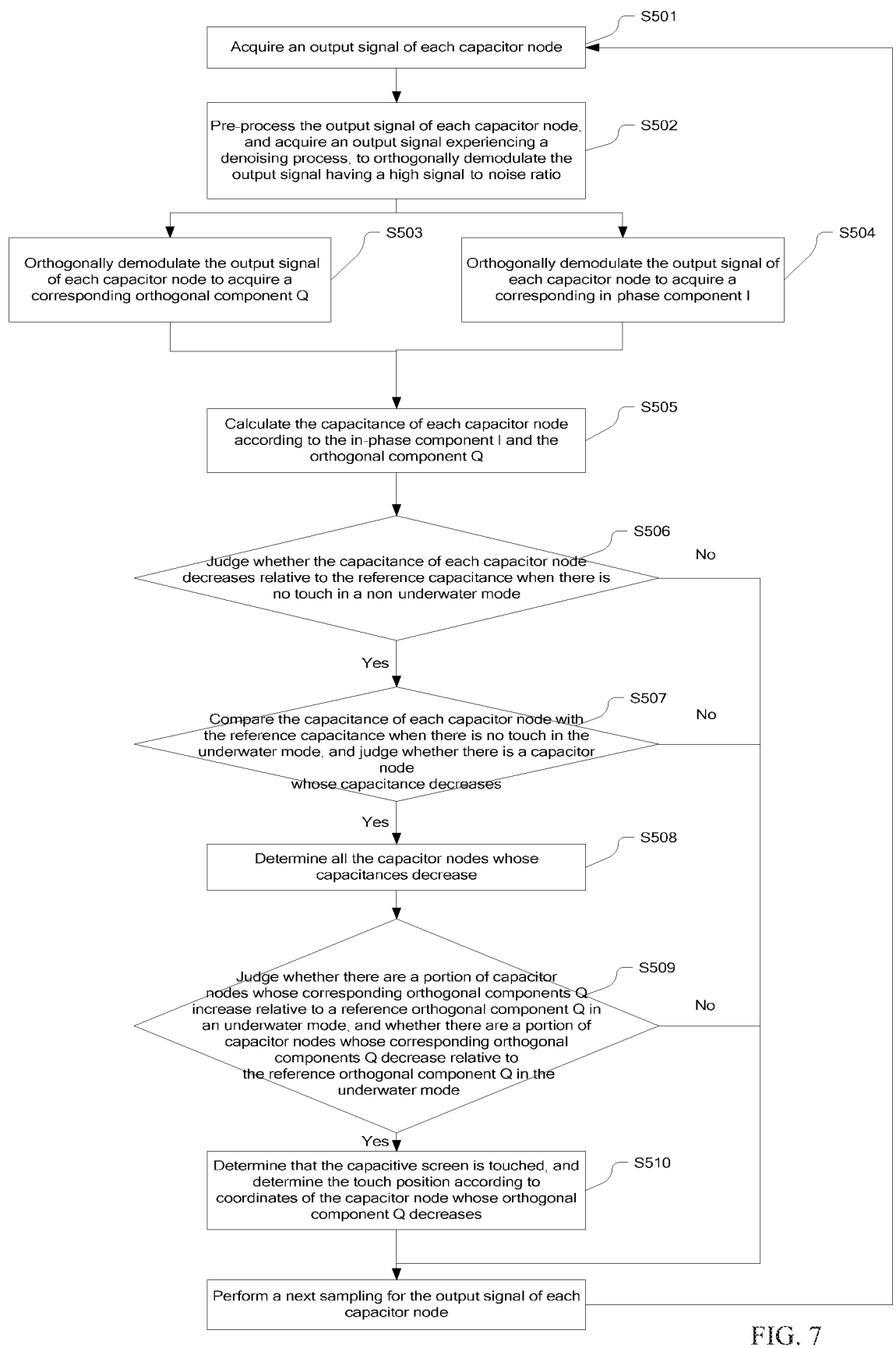
FIG. 7 is a flowchart of an apparatus for determining a touch position of a capacitive screen according to a fifth embodiment of the present application.

Referring to FIG. 7, in another specific embodiment of the present application, based on the embodiment as illustrated in FIG. 6, a step of judging whether there is a touch is added. Specifically, the method includes the following steps:

S501: acquiring an output signal of each capacitor node;

S502: performing pre-processing to the output signal of each capacitor node to obtain an denoised output signal which can be orthogonally demodulated in the following steps.

S503: performing orthogonal demodulation to the output signal of each capacitor node to acquire a corresponding orthogonal component Q.

S504: performing orthogonal demodulation to the output signal of each capacitor node to acquire a corresponding in-phase component I.

S505: calculating the capacitance of each capacitor node according to the in-phase component I and the orthogonal component Q.

S506: judging whether the capacitance of each capacitor node decreases relative to a reference capacitance acquired when there is no touch in the non-underwater mode.

S507: comparing the capacitance of each capacitor node with the reference capacitance obtained when there is no touch in the underwater mode, and judging whether there is a capacitor node whose capacitance decreases.

Specifically, if there is a capacitor node whose capacitance decreases, the current capacitor node is subject to a press action.

S508: determining all of the capacitor nodes whose capacitances decrease to judge, among all of the capacitor nodes whose capacitances decrease, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode.

Specifically, if it is determined that there is a capacitor node whose capacitance decreases in step S507, all of the capacitor nodes whose capacitances decrease are determined, that is, coordinates of the capacitor node are acquired.

In this step, all of the capacitor nodes whose capacitances decrease are determined for further processing. This prevents further processing of all the capacitor nodes of the screen.

S509: judging, among all of the capacitor nodes whose capacitances decrease, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode, performing step if judgment indicates a positive result, or otherwise performing a next sampling to the output signal of each capacitor node.

S510: determining that the capacitive screen is touched, and determining the touch position according to coordinates of the capacitor nodes whose orthogonal component Q decrease.

In this embodiment of the present application, according to the variations of the capacitances, whether a touch event is generated on the screen is judged. When a touch event is generated, all the capacitor nodes whose capacitances decrease are determined for further processing. This prevents further processing of all the capacitor nodes of the screen, and thus reduces the calculation workload of the processor and improves the processing speed.

In this embodiment, steps S501, S502, S503, S504, S505, S506, S409 and S510 are respectively similar to steps S401, S402, S403, S404, S405, S406, S407 and S408 in the embodiment as illustrated in FIG. 6, which are not described herein any further.

Another embodiment of the present application provides an apparatus for determining a touch position of a capacitive screen.

Figure 8:
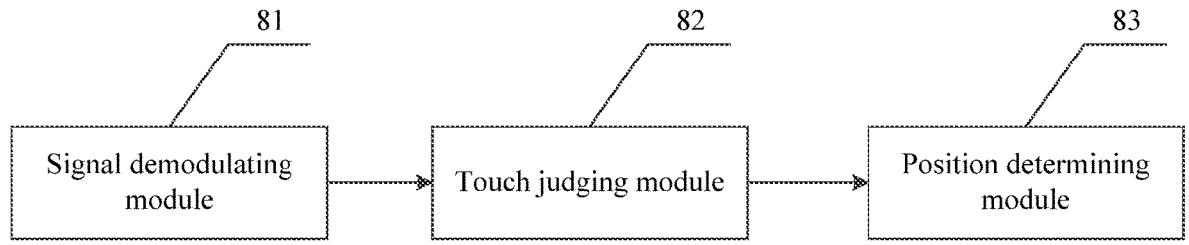
FIG. 8 is a schematic structural diagram of an apparatus for determining a touch position of a capacitive screen according to a first embodiment of the present application.

Referring to FIG. 8, the apparatus includes:

A signal demodulating module 81, configured to acquire an output signal of each capacitor node, and orthogonally demodulate the output signal of each capacitor node to acquire a corresponding orthogonal component Q.

In this embodiment, the capacitive screen includes a touch controller chip and a screen provided with a plurality of capacitor nodes, and the output signal may be acquired by the touch controller chip from the capacitor nodes. Specifically, the touch controller chip includes a sending end and a receiving end. The sending end may send a signal having a fixed frequency, where the waveform of the signal may be a square wave or a sine wave or the like. The signal may be acquired by orthogonal modulation of two sub signals with a 90-degree phase difference but the same frequency. The signal sent by the sending end is input to an electrode plate of each capacitor node, coupled by the capacitor node, and output from the other electrode plate of the capacitor node to the receiving end of the touch controller chip. In this embodiment, the signal output from the other electrode plate of the capacitor node is used as the output signal.

In this embodiment, a signal having the same frequency as the signal sent by the sending end is extracted from the output signals received by the touch controller chip, and the extracted signal is orthogonally demodulated to acquire an orthogonal component Q. This embodiment provides a method for acquiring an orthogonal component Q. The method specifically includes the following steps:

After the touch controller chip obtains an output signal $A \sin(\omega t+\varphi)$ of the capacitor node, the signal is frequency-mixed by using a multiplier to obtain a signal $\frac{1}{2}[A \sin(2\omega t+\varphi)+A \sin \varphi]$, the frequency-mixed signal is filtered by using a low-pass filter to filter an alternating current signal therein and retain a direct current signal $\frac{1}{2}A \sin(\varphi)$ therein, the direct current signal is integrated by using an integrator: $N[\frac{1}{2}A \sin(\varphi)]$, to obtain an orthogonal component Q, where A denotes an amplitude, $\omega$ denotes an angular velocity, φ denotes an initial phase, and N denotes a number of cycles of the signal.

A touch judging module 82 is configured to judge whether the orthogonal component Q corresponding to some of the capacitor nodes increases relative to a reference orthogonal component Q in an underwater mode, and the orthogonal component Q corresponding to some other of the capacitor nodes decreases relative to the reference orthogonal component Q in the underwater mode.

In practice of the present application, the inventors have found through a large number of statistical collections that when the capacitive screen is touched underwater as illustrated in FIG. 2, the variation of the orthogonal component Q relative to the reference orthogonal component may be simply identified, such that whether a touch event is generated on the capacitive screen may be determined. The reference orthogonal component refers to an orthogonal component Q obtained by orthogonal demodulating the output signal of the capacitor node when there is no touch underwater.

In this embodiment, the orthogonal components Q of the capacitor nodes are compared with the reference orthogonal components Q in the underwater mode, and the capacitor nodes whose orthogonal components Q increase and the capacitor nodes whose orthogonal components Q decrease are respectively statistically collected to respectively acquire corresponding statistical values. If the two statistical values are both greater than a predetermined threshold, it is considered that there are a portion of capacitor nodes whose corresponding orthogonal components Q increase relative to the reference orthogonal component Q in the underwater mode and there are a portion of capacitor nodes whose corresponding orthogonal components Q decrease relative to the reference orthogonal component Q in the underwater mode. Using FIG. 2 as an example, the data in FIG. 2 are values obtained by subtracting the actual orthogonal components from the reference orthogonal component Q. Therefore, a positive value indicates that the orthogonal component Q decreases, a negative value indicates that the orthogonal component Q increases, and a value 0 indicates that the orthogonal component Q does not change. If the predetermined threshold is defined as 20, there are 149 capacitor nodes whose orthogonal components Q decrease in FIG. 2, there are 89 capacitor nodes whose orthogonal components Q increase in FIG. 2, and there is one node whose orthogonal component Q does not change. The statistical values of the capacitor nodes whose orthogonal components Q increase and the capacitor nodes whose orthogonal components Q decrease are both greater than the predetermined threshold. Therefore, it may be determined that the capacitive screen is touched. The above data is only intended to adaptively describe this embodiment, and the predetermined threshold may be defined according to practice, which is not limited in this embodiment.

In this embodiment, whether there are a portion of capacitor nodes whose corresponding orthogonal components Q increase relative to the reference orthogonal component Q in the underwater mode, and whether there are a portion of capacitor nodes whose corresponding capacitance decrease relative to the reference orthogonal component Q in the underwater mode may be judged according to an envelop curve. Using FIG. 2 as an example, if there is a capacitor node whose variation is inverse to the current capacitor node among the adjacent capacitor nodes of the current capacitor node, it is considered that the current capacitor node is on the envelop curve. The capacitor nodes on the envelop curve are statistically collected to obtain a statistical value. If the statistical value is greater than a predetermined threshold and the envelop is clear, it is determined that the capacitive screen is touched.

A position determining module 83 is configured to determine the touch position according to coordinates of the capacitor node whose orthogonal component Q decreases if the touch judging module 82 judges that the capacitive screen is touched.

When the capacitive screen is touched, if the orthogonal component Q corresponding to the capacitor node at the actual touch position decreases, and the orthogonal components Q corresponding to the capacitor nodes in the vicinity of the actual touch position decrease too, the capacitor nodes whose orthogonal components Q decrease is subject to a press action. If the orthogonal components Q of the capacitor nodes in other regions increase, the capacitor nodes whose orthogonal components Q increase do not subject to a press action. Therefore, the touch regions described in this step may include the actually touched regions and the regions in the vicinity of the actually touched regions. In determination of the touch position, coordinates of the capacitor node at the actual touch position and coordinates of the capacitor nodes in the vicinity of the actual touch position may be both considered to calculate the touch position.

Figure 9:
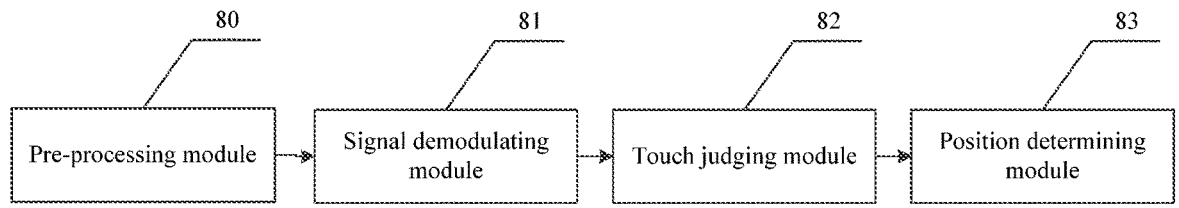
FIG. 9 is a schematic structural diagram of an apparatus for determining a touch position of a capacitive screen according to a second embodiment of the present application.

Referring to FIG. 9, in another specific embodiment of the present application, based on the embodiment as illustrated in FIG. 7, the apparatus further includes a pre-processing module 80, configured to pre-process the output signal of each capacitor node, and acquire a denoised output signal for orthogonal demodulation.

Specifically, the pre-processing includes: amplifying the output signal of the capacitor node, and denoising the output signal of the capacitor node to improve the signal-to-noise ratio.

In this embodiment of the present application, the output signal of the capacitor node is pre-processed, and a denoised output signal is acquired. This improves the accuracy of signal processing.

In this embodiment, the signal demodulating module is further configured to orthogonally demodulate the output signal of each capacitor node to acquire a corresponding in-phase component I. This embodiment provides a method for acquiring an in-phase component I. The method specifically includes the following steps:

After the touch controller chip obtains an output signal A $\sin(\omega t+\varphi)$ of the capacitor node, the signal is frequency-mixed by using a multiplier to obtain a signal $-\frac{1}{2}[A\cos(2\omega t+\varphi)-A\cos\varphi]$, the frequency-mixed signal is filtered by using a low-pass filter to filter an alternating current signal therein and retain a direct current signal $\frac{1}{2}A\cos(\varphi)$ therein, the direct current signal is integrated by using an integrator: $N[\frac{1}{2}A\cos(\varphi)]$, to obtain an in-phase component I. A denotes an amplitude, $\omega$ denotes an angular velocity, $\varphi$ denotes an initial phase, and N denotes a number of cycles of the signal.

Figure 10:
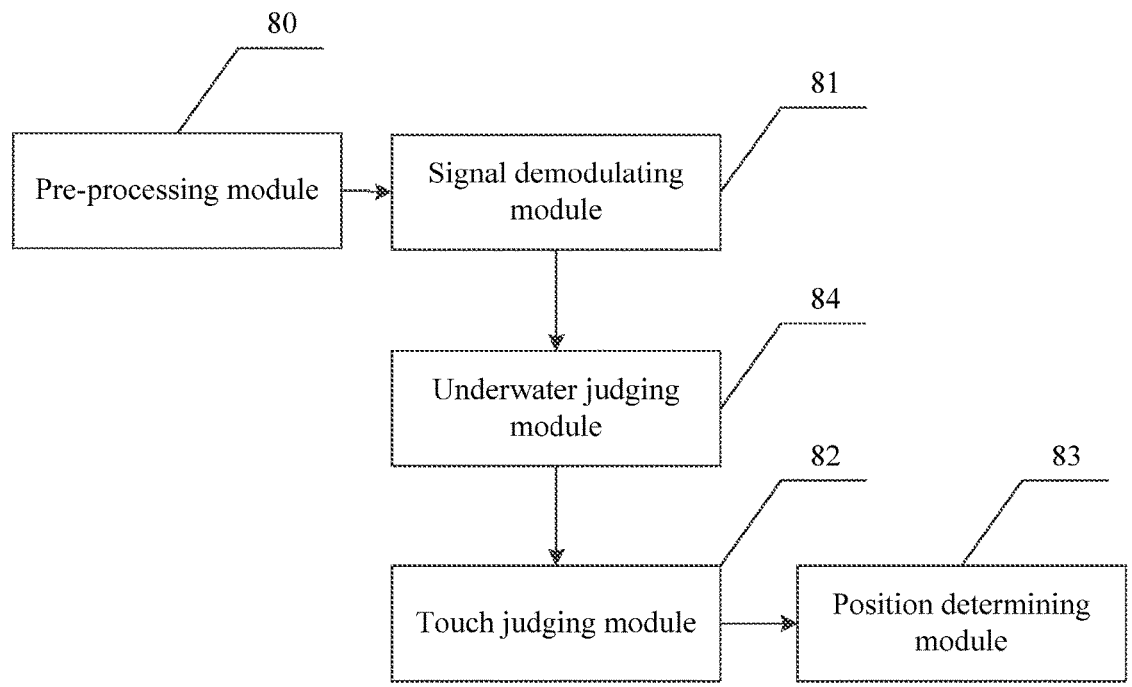
FIG. 10 is a schematic structural diagram of an apparatus for determining a touch position of a capacitive screen according to a third embodiment of the present application.

Referring to FIG. 10, in another specific embodiment of the present application, based on the embodiment as illustrated in FIG. 9, the apparatus further includes: an underwater judging module 84, configured to acquire a capacitance of each capacitor node, and judge whether the capacitive screen enters the underwater mode according to the capacitance.

Specifically, in this embodiment, the signal demodulating module 81 is further configured to orthogonally demodulate the output signal to acquire a corresponding in-phase component I.

Specifically, the underwater judging module 84 may calculate the capacitance of each capacitor node according to moduli of the in-phase component I and the orthogonal component Q. The capacitance is proportional to the actual capacitance of the capacitor node, and the capacitance may be calculated using the following formula:

$$C=\sqrt{I^2+Q^2} \quad (1)$$

The underwater judging module 84 may compare the capacitance of each capacitor node with a reference capacitance when there is no touch in the underwater mode, and judge whether there is a capacitor node whose capacitance decreases; if there is a capacitor node whose capacitance decreases, determine that the touch screen is in the underwater mode; or otherwise, determine that the touch screen is in the non-underwater mode.

Specifically, in this embodiment, the touch judging module 82 is further configured to compare the capacitance of each capacitor node with the reference capacitance when there is no touch in the underwater mode, and judge whether there is a capacitor node whose capacitance decreases; and if there is a capacitor node whose capacitance decreases, determine all the capacitor nodes whose capacitances decrease to judge, in all the capacitor nodes whose capacitances decrease, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode.

In this embodiment of the present application, according to the variations of the capacitances, whether the capacitive screen is in the underwater mode is judged, and whether a touch event is generated on the screen is judged. When a touch event is generated, all the capacitor nodes whose capacitances decrease are determined for further processing. This prevents further processing of the capacitor nodes of the whole screen, and thus reduces the calculation workload of the processor and improves the processing speed.

Still another embodiment of the present application further provides a non-volatile computer storage medium. The non-volatile computer storage medium stores computer-executable instructions, which, when being executed, cause a computer to: acquire an output signal of each capacitor node, and orthogonally demodulate the output signal to acquire a corresponding orthogonal component Q; judge whether there are a portion of capacitor nodes whose corresponding orthogonal components Q increase relative to a reference orthogonal component Q in an underwater mode, and whether there are a portion of capacitor nodes whose corresponding orthogonal components Q decrease relative to the reference orthogonal component Q in the underwater mode; and determine that the capacitive screen is touched, and determine the touch position according to coordinates of the capacitor node whose orthogonal component Q decreases if the judgment indicates a positive result.

Figure 11:
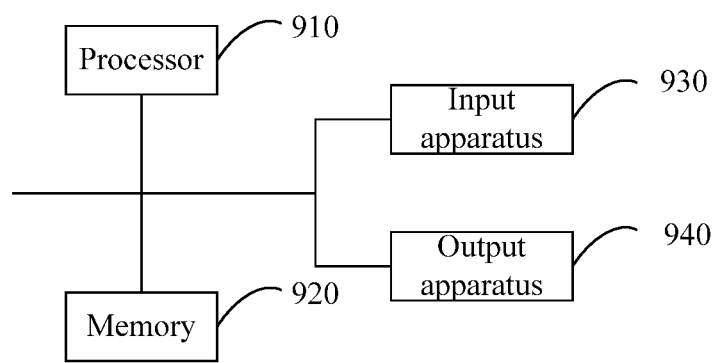
FIG. 11 is a schematic structural diagram of hardware of an electronic device for performing the methods of determining a touch position of a capacitive screen according to the present application.

FIG. 11 is a schematic structural diagram illustrating hardware of some electronic devices for performing a method for determining a touch position of a capacitive screen according to the present application.

As illustrated in FIG. 11, the electronic device includes at least one processor 910 and a memory 920, and FIG. 11 uses one processor 910 as an example.

The electronic device for performing the method for determining a touch position of a capacitive screen may further include: an input apparatus 930 and an output apparatus 940.

The processor 910, the memory 920, the input apparatus 930 and the output apparatus 940 may be connected to each other via a bus or in another manner FIG. 11 uses connection via a bus as an example for description.

The memory 920 is a non-volatile computer readable storage medium, and may be used to store non-volatile software programs, non-volatile computer executable programs and modules, such as program instructions/modules corresponding to the method for determining a touch position of a capacitive screen in the embodiments of the present application. The non-volatile software programs, instructions and modules stored in the memory 920, when being executed, cause the processor 910 to perform various function applications and data processing of a server, that is, performing the method for determining a touch position of a capacitive screen in the above method embodiments.

The memory 920 may also include a program storage area and a data storage area. The program storage area may store an operating system and an application implementing at least one function. The data storage area may store data created according to use of the apparatus for determining a touch position of a capacitive screen. In addition, the memory 920 may include a high speed random access memory 920, or include a non-volatile memory 920, for example, at least one disk storage device 920, a flash memory device, or another non-volatile solid storage device 920. In some embodiments, the memory 920 optionally includes memories 920 remotely configured relative to the processor 910. These memories may be connected to the apparatus for determining a touch position of a capacitive screen over a network. The above examples include, but not limited to, the Internet, Intranet, local area network, mobile communication network and a combination thereof.

The input apparatus 930 may receive input digital or character information, and generate signal input related to user settings and function control of the apparatus for determining a touch position of a capacitive screen. The input apparatus 930 may include a press module and the like device.

One or more modules are stored in the memory 920, and when being executed by the at least one processor 910, perform the method for determining a touch position of a capacitive screen in any of the above method embodiments.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

The electronic device in the embodiments of the present application is practiced in various forms, including, but not limited to:

(1) a mobile communication device: which has the mobile communication function and is intended to provide mainly voice and data communications; such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, an MID, an UMPC device and the like, for example, an iPad; (3) a portable entertainment device: which displays and plays multimedia content; such devices include: an audio or video player (for example, an iPod), a palm game machine, an electronic book, and a smart toy, and a portable vehicle-mounted navigation device;

(4) a server: which provides services for computers, and includes a processor 910, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device; and (5) another electronic device having the data interaction function.

The above described apparatus embodiments are merely for illustration purpose only. The modules which are described as separate components may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments. Persons of ordinary skill in the art may understand and implement the present application without paying any creative effort.

According to the above embodiments of the present application, a person skilled in the art may clearly understand that the embodiments of the present application may be implemented by means of hardware or by means of software plus a necessary general hardware platform. Based on such understanding, portions of the technical solutions of the present application that essentially contribute to the related art may be embodied in the form of a software product, the computer software product may be stored in a computer readable storage medium. The computer-readable storage medium includes any mechanism for storing or transferring information in a computer readable form. For example, the computer-readable medium includes a read-only memory (ROM), a random access memory (RAM), a disk storage medium, an optical storage medium, a flash storage medium, electricity, light, sound and other forms of propagation signals (for example, a carrier, an infrared signal, a digital signal and the like), and the like. The computer software product includes several instructions for instructing a computer device (which may be a personal computer, a server, or a network device) to perform all the embodiments or some parts of the embodiments.

Finally, it should be noted that the above embodiments are merely intended to describe the technical solutions of the embodiments of the present application, instead of limiting the present application. Although the present application is described in detail with reference to the above embodiments, persons of ordinary skill in the art should understand that various modifications may be made to the technical solutions described in the above embodiments or equivalent replacements may be made to some technical features thereof, without departing from the spirit and scope of the technical solutions of the embodiments of the present application.

What is claimed is:

1. A method for determining a touch position of a capacitive screen, comprising:

acquiring an output signal of each capacitor node of the capacitive screen, and orthogonally demodulating the output signal to acquire a corresponding orthogonal component Q;

judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode to obtain a positive result or a negative result; and determining that the capacitive screen is touched, and determining the touch position according to coordinates of the capacitor node whose orthogonal component Q decreases if the judgment indicates a positive result.

2. The method according to claim 1, wherein the orthogonally demodulating the output signal to acquire a corresponding orthogonal component Q comprises:

pre-processing the output signal of each capacitor node, and acquiring a denoised output signal for the orthogonal demodulating.

3. The method according to claim 1, wherein when there is no touch underwater, the output signal of the capacitor node is orthogonally demodulated to acquire the reference orthogonal component Q in the underwater mode.

4. The method according to claim 1, further comprising:

acquiring a capacitance of each capacitor node, and judging whether the capacitive screen enters the underwater mode according to the capacitance; and if the capacitive screen enters the underwater mode, judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode.

5. The method according to claim 4, further comprising: orthogonally demodulating the output signal to acquire a corresponding in-phase component I;

wherein the acquiring a capacitance of each capacitor node, and judging whether the capacitive screen enters the underwater mode according to the capacitance comprises:

calculating the capacitance of each capacitor node according to the in-phase component I and the orthogonal component Q; and determining that the capacitive screen is in the underwater mode if the capacitance of each capacitor node decreases relative to a reference capacitance obtained when there is no touch in a non-underwater mode.

6. The method according to claim 5, wherein the calculating the capacitance of each capacitor node according to the in-phase component I and the orthogonal component Q comprises: calculating moduli of the in-phase component I and the orthogonal component Q to acquire the capacitance of each capacitor node.

7. The method according to claim 5, wherein upon determining that the capacitive screen is in the underwater mode, the method further comprises:

comparing the capacitance of each capacitor node with the reference capacitance obtained when there is no touch in the underwater mode to judge whether there is a capacitor node whose capacitance decreases; and determining all of the capacitor nodes whose capacitances decrease to judge, among all of the capacitor nodes whose capacitances decrease, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode.

8. The method according to claim 1, wherein the judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode comprises: judging, according to an envelop curve, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode.

9. An apparatus for determining a touch position of a capacitive screen, comprising:
  a signal demodulating module, configured to acquire an output signal of each capacitor node, and orthogonally demodulate the output signal of each capacitor node to acquire a corresponding orthogonal component Q;
  a touch judging module, configured to judge whether there are a portion of capacitor nodes whose corresponding orthogonal components Q increase relative to a reference orthogonal component Q in an underwater mode, and whether there are a portion of capacitor nodes whose corresponding orthogonal components Q decrease relative to the reference orthogonal component Q in the underwater mode; and
  a position determining module, configured to determine that the capacitive screen is touched, and determine the touch position according to coordinates of the capacitor node whose orthogonal component Q decreases if it is judged that the capacitive screen is touched.

10. The apparatus according to claim 9, further comprising:
  a pre-processing module, configured to pre-process the output signal of each capacitor node to acquire a denoised output signal for the orthogonal demodulating.

11. The apparatus according to claim 9, further comprising:
  an underwater judging module, configured to acquire a capacitance of each capacitor node, and judge whether the capacitive screen enters the underwater mode according to the capacitance.

12. The apparatus according to claim 9, wherein the touch judging module is further configured to compare a capacitance of each capacitor node with a reference capacitance obtained when there is no touch in the underwater mode, and judge whether there is a capacitor node whose capacitance decreases;
  if there is a capacitor node whose capacitance decreases, determine all the capacitor nodes whose capacitances decrease to judge, among all the capacitor nodes whose capacitances decrease, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode.

13. A non-volatile computer storage medium, storing a computer-executable instruction, wherein the computer-executable instruction, when being executed, is configured to cause a computing device to perform a method comprising:
  acquiring an output signal of each capacitor node of a capacitive screen, and orthogonally demodulating the output signal to acquire a corresponding orthogonal component Q;
  judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode to obtain a positive result or a negative result; and
  determining that the capacitive screen is touched, and determining the touch position according to coordinates of the capacitor node whose orthogonal component Q decreases if the judgment indicates a positive result.

14. The non-volatile computer storage medium according to claim 13, wherein the orthogonally demodulating the output signal to acquire a corresponding orthogonal component Q comprises:
  pre-processing the output signal of each capacitor node, and acquiring a denoised output signal for the orthogonal demodulating.

15. The non-volatile computer storage medium according to claim 13, wherein when there is no touch underwater, the output signal of the capacitor node is orthogonally demodulated to acquire the reference orthogonal component Q in the underwater mode.

16. The non-volatile computer storage medium according to claim 13, further comprising:
  acquiring a capacitance of each capacitor node, and judging whether the capacitive screen enters the underwater mode according to the capacitance; and
  if the capacitive screen enters the underwater mode, judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode.

17. The non-volatile computer storage medium according to claim 16, further comprising: orthogonally demodulating the output signal to acquire a corresponding in-phase component I;
  wherein the acquiring a capacitance of each capacitor node, and judging whether the capacitive screen enters the underwater mode according to the capacitance comprises:
  calculating the capacitance of each capacitor node according to the in-phase component I and the orthogonal component Q; and
  determining that the capacitive screen is in the underwater mode if the capacitance of each capacitor node decreases relative to a reference capacitance obtained when there is no touch in a non-underwater mode.

18. The non-volatile computer storage medium according to claim 17, wherein the calculating the capacitance of each capacitor node according to the in-phase component I and the orthogonal component Q comprises: calculating moduli of the in-phase component I and the orthogonal component Q to acquire the capacitance of each capacitor node.

19. The non-volatile computer storage medium according to claim 17, wherein upon determining that the capacitive screen is in the underwater mode, the method further comprises:
 comparing the capacitance of each capacitor node with the reference capacitance obtained when there is no touch in the underwater mode to judge whether there is a capacitor node whose capacitance decreases; and
 determining all of the capacitor nodes whose capacitances decrease to judge, among all of the capacitor nodes whose capacitances decrease, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode.

20. The non-volatile computer storage medium according to claim 13, wherein the judging whether corresponding orthogonal components Q of some of the capacitor nodes increase relative to a reference orthogonal component Q in an underwater mode, and whether corresponding orthogonal components Q of some other capacitor nodes decrease relative to the reference orthogonal component Q in the underwater mode comprises: judging, according to an envelop curve, whether there are a portion of capacitor nodes whose corresponding orthogonal components Q increase relative to the reference orthogonal component Q in the underwater mode, and whether there are a portion of capacitor nodes whose corresponding orthogonal components Q decrease relative to the reference orthogonal component Q in the underwater mode.

\* \* \* \* \*